Oct. 6, 1959

K. A. KOLLMANN 2,907,230

HYDROSTATIC POWER TRANSMISSIONS AND BRAKES

Filed Aug. 16, 1956

KARL A. KOLLMANN INVENTOR.

BY Dicke and Craig

ATTORNEYS.

United States Patent Office 2,907,230
Patented Oct. 6, 1959

2,907,230

HYDROSTATIC POWER TRANSMISSIONS AND BRAKES

Karl A. Kollmann, Karlsruhe, Baden, Germany, assignor to Daimler-Benz Aktiengesellschaft, Stuttgart-Unterturkheim, Germany Application August 16, 1956, Serial No. 604,532

Claims priority, application Germany August 30, 1955

16 Claims. (Cl. 74—687)

This invention relates to improved hydrostatic power transmissions and brakes and has for an object to provide a hydrostatic power transmission capable of providing an infinitely variable drive ratio between an input means and an output means together with hydrostatic means for braking the output means.

Another object is to provide hydrostatic power transmission of a generally known axial piston type utilizing power-branching for providing infinitely variable drive ratios between an input shaft and an output shaft together with means for utilizing said transmission to brake the output shaft.

Another object is to provide such means including two independently rotatable cylinder blocks having pistons therein together with an adjustable swash plate for each of said sets of pistons, which swash plates rotate with the output shaft, together with conduits connecting said sets of cylinders and throttling means within said conduits for throttling the flow between the sets of cylinders at will.

Another object is to provide such means including two independently rotatable cylinder blocks having pistons therein with an adjustable swash plate for each of said sets of pistons, together with an adjustable pressure relief valve connecting the said conduits between the sets of cylinders.

Another object is to provide such a power transmission having input means and output means, two positive displacement devices acting as pump and/or fluid motor, at least one of which is of the variable displacement type, each of said devices having piston operating means connected for rotation with the output means, one having cylinder means rotated directly by the input means and the other having cylinder means driven by the input means through planetary gearing, conduits connecting said displacement devices to form a hydraulic circuit including both of said devices, together with means adapted to restrict, at will, delivery of fluid from at least one of said devices to provide braking of the output means.

Another object is to utilize as such positive displacement devices axial piston units of the type having swash plates for operating the pistons.

Other objects will become apparent from the following description taken in connection with the attached drawings showing several illustrative embodiments of the invention and wherein.

Figure 2:
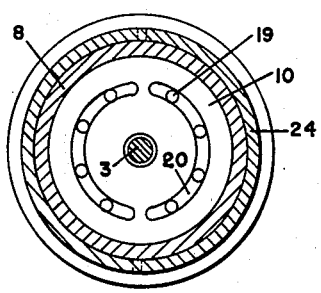
Figure 2 is a cross-sectional view of the form shown in Figure 1 taken along the line II—II of Figure 1 looking in the direction of the arrows.
Figure 3:
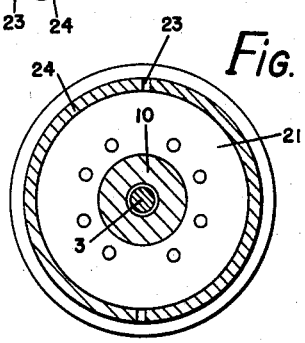
Figure 3 is a cross-sectional view of the form shown in Figure 1 taken along the line III—III of Fig. 1 looking in the direction of the arrows.

Referring to the drawings, numeral 1 indicates an input shaft driven by a power source such as an internal combustion engine. Numeral 2 indicates a clutch for connecting shaft 1 at will to drive shaft 3 which carries the sun gear 4 of a power branching planetary transmission consisting, in the form shown, of planetary gears 5 and the fixed or fixable ring gear 6. The drive shaft 3 extends further to the right of the sun gear 4 through the hollow shaft 7 on which is mounted the carrier element of the planetary transmission upon which the planetary gears 5 are journalled. The numeral 8 indicates a housing connected to the output shaft 9 and rotating therewith. The housing 8 is formed with a transverse wall 10. Two swash plates 11 and 12 are swingably mounted as on journals 13 and 14 within the housing 8 for rotation therewith. The angularity of the swash plates is adjustable at will by any known or suitable adjusting mechanism (not shown). Connected with the drive shaft 3 for rotation therewith is the cylinder block 15. Similarly, cylinder block 16 is connected with hollow shaft 7 for rotation therewith. Cylinder blocks 15 and 16 are each formed with a plurality of cylinder bores, eight cylinders being shown for illustration. Pistons 17 are slidably fitted in the cylinder bores of cylinder block 15 and pistons 18 are slidably fitted in the cylinder bores of cylinder block 16. The transverse wall 10 is shown provided with eight bores 19 connecting with corresponding ports in the cylinders of cylinder blocks 15 and 16. As shown in Figure 2, groups of four of said bores 19 are each connected together through semi-circular grooves 20 formed on each face of the transverse wall 10. A throttling plate or ring 21 is similarly provided with eight bores which may register with the communicating passages 19. The throttling plate 21 is, however, rotatable about the axis of shafts 3 and 9 and housing 8. To adjust the rotative position of plate 21, at least two pins 22 are provided upon the periphery thereof, which pins enter the sloping or helical slots 23 in a ring 24 which is slidable axially upon the housing 8.

The manner of operation of the form of transmission described in normal use, namely when used as a torque converting power transmission between the power source (shaft 1) and the output member (shaft 9) is well known. By varying the angularity of swash plates 11 and/or 12, any desired drive ratio, including neutral and reverse may be achieved.

Figure 1:
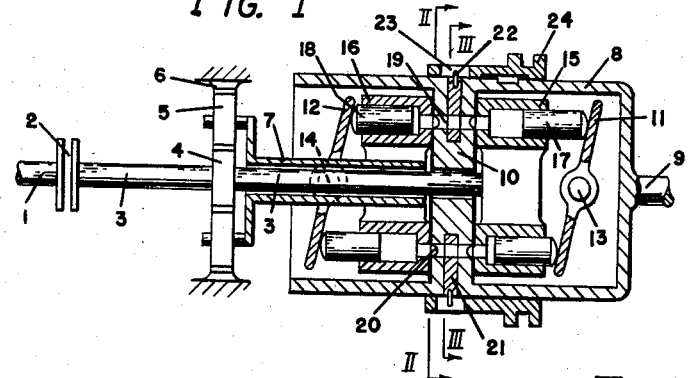
Figure 1 shows more or less schematically in longitudinal cross-section a form of embodiment selected to illustrate one form the invention may take.
Figure 4:
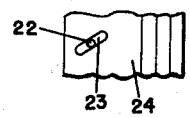
Figure 4 is partial plan view of the ring 24 provided with helical grooves 23.

If the output member (shaft 9) is to be braked, the axially slidable ring 24 is moved to the right so that the pins 22 through sloping or helical slots 23 cause the throttling plate 21 to be rotated. Therefore, the bores in the plate 21 no longer register with the communicating bores 19. Assuming that swash plates 11 and 12 are in the positions shown in Figure 1, the fluid displaced by the pistons must pass to the other side of the transverse wall 10. Since the bores 19 through the transverse wall 10 are partly closed, the pistons 17 are subjected to a substantially higher pressure than that acting upon the pistons 18.

Depending upon the angular positioning of the swash plates 11 and 12, the shaft 9 which is to be braked rotates in a definite relation to the speed of rotation of shaft 3. In the situation in which the swash plate adjustment is such that the pistons in one cylinder block displace through one stroke exactly as much fluid as can be accepted by the pistons of the other drum during their suction strokes, the shaft 3 necessarily stands still. Since ring gear 6 stands still, the hollow shaft 7 and the cylinder block 16 must then also stand still. The power source 1 may remain connected with the input shaft 3 through clutch 2 during the braking operation or it may be disconnected therefrom. The braking operation may be varied through axial adjustment of the ring 24 and, therefore, through rotary adjustment of the throttling plate 21, and/or through varying the angularity of the swash plates 11 and/or 12.

Figure 5:
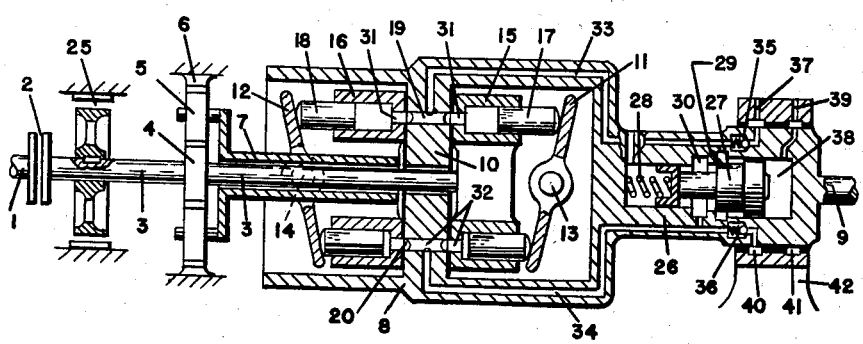
Figure 5 shows more or less schematically in longitudinal cross-section another form of embodiment selected to illustrate another form the invention may take.

The illustrative form of transmission shown in Figure 5 differs only slightly from the construction shown in Figures 1 through 4. No throttling means are provided in the passages passing through the transverse wall 10. Braking is achieved by a suitable setting of the angularity of the swash plates 11 and 12. When one set of pistons delivers more fluid than the other set of pistons can accept, the excess fluid is bypassed through a pressure relief valve in the fluid current. For this purpose, there is carried by the housing 8 a valve housing 26 in which is located a slidable stepped piston 27 spring pressed towards the right by spring 28 as viewed in Figure 5. Pressure space 30 to the left of piston 27 is connected through conduit 34 with the communicating passage 32 in the wall 10. The communicating passage 19 in the wall 10 is connected through conduit 33 with the pressure space 29. As shown, the valve housing 26 is journalled within the fixed machine part 42 which may have a fluid supply channel 37 connected with an annular groove 40 in the part 42 which connects through check valves 35 and 36 with passages 33 and 34 so that replenishing fluid may enter that part of the fluid circuit which is under lower pressure. The space 38 to the right of the stepped piston is connected to a control pressure conduit 39 leading to groove 41 in the fixed machine part 42.

With this form of construction, a supplemental brake 25 is provided for braking the shaft 3 together with the sun gear 4 and therefore the planetary gears 5 causing the two cylinder blocks 15 and 16 to be held stationary. In this case, the power source 1 may continue operating when the clutch 2 is disengaged. The swash plates 11 and 12 are brought into such angular positions that the fluid displaced by the pistons (for example 17) cannot be accepted by the cylinders in the now stationary cylinder block 16 so that both pistons 17 and 18 operating in the stationary cylinder blocks 15 and 16 deliver more or less fluid into the conduit 33 and to the pressure space 29. This causes a pressure in the conduit 33 and space 29 to build up until it pushes the stepped piston 27 to the right against the pressure in control pressure space 38. When this occurs, a passage is opened from space 29 to the left of piston 27 which communicates with conduit 34 thus providing a bypass for the fluid. The pressure necessary to open said passage by moving piston 27 to the right, and, therefore, the braking force, may be varied by varying the control pressure in the conduit 39 and thereby in the pressure space 38.

The invention is not intended to be limited to the two illustrative forms shown and described which are to be understood as illustrative only and not as limiting, as various changes in construction and arrangement may be made, including combining features of the said two forms, all coming within the scope of the claims which follow.

I claim:

1. In a hydrostatic power transmission utilizing a hydraulic medium of the type having input means and output means, two positive displacement devices at least one of which is of the variable volume type and both of which are connected for operation with said output means, said devices being of the axial piston type each comprising a cylinder block having cylinder bores, a set of pistons in the cylinder bores of each block, a swash plate for operating each of said sets of pistons and a common valve plate for all said pistons connected for rotation with said output means, and conduits connecting said devices to form a hydraulic circuit for said hydraulic medium including both of said devices, the combination of braking means for said output means operative to restrict, at will, delivery of fluid from at least one of said devices to thereby increase the pressure of said hydraulic medium and therewith effect braking of said output means as a result of such pressure increase.

2. In a hydrostatic power transmission utilizing a hydraulic medium of the type having input means and output means, two positive displacement devices at least one of which is of the variable volume type and both of which are connected for operation with said output means, said devices being of the axial piston type each comprising a cylinder block having cylinder bores, a set of pistons in the cylinder bores of each block, a swash plate for operating each of said sets of pistons, both of said swash plates being drivingly connected to said output means and a common valve plate for all said pistons connected for rotation with said output means, and conduits connecting said devices to form a hydraulic circuit for said hydraulic medium including both of said devices, the combination of braking means for said output means operative to restrict, at will, deliverey of fluid from one of said devices to the other device to thereby increase the pressure of said hydraulic medium and therewith effect braking of said output means as a result of such pressure increase.

3. The combination according to claim 1, wherein said braking means includes a pressure relief valve connected between said conduits.

4. The combination according to claim 1, wherein said braking means includes a pressure relief valve connected between said conduits, said relief valve comprising a piston biased in one direction by spring means, a pressure space at the other end and means for applying a variable pressure control fluid to said pressure space tending to move said piston in opposition to said spring means, and a second pressure space connected to one of said conduits and tending to move said piston toward the first-mentioned pressure space.

5. The combination according to claim 1, wherein said braking means includes a pressure relief valve connected between said conduits, a journal for said output means and means for replenishing fluid to said devices including a supply conduit leading to said journal.

6. The combination according to claim 1, wherein said braking means includes a pressure relief valve connected between said conduits, a journal for said output means and means for replenishing fluid to said devices including a supply conduit leading to said journal together with passages leading from said journal to said conduits and a check valve in each of said passages.

7. In a hydrostatic power transmission utilizing a hydraulic medium of the type having input means and output means, two positive displacement devices at least one of which is of the variable volume type and both of which are connected for operation with said output means, one of said devices being driven directly by the input means and the other being driven by the input means through planetary gearing connected to the input means and to a fixed ring gear, whereby power branching is effected, and conduits connecting said devices to form a hydraulic circuit for said hydraulic medium including both of said devices, the combination of braking means for said output means operative to restrict, at will, delivery of fluid from at least one of said devices to thereby increase the pressure of said hydraulic medium and therewith effect braking of said output means as a result of such pressure increase.

8. An arrangement for braking a motor vehicle driven by an engine with the aid of a hydrostatic transmission utilizing a hydraulic medium, said hydrostatic transmission including two cylinder blocks accommodating therein pistons, two conduit systems provided with throttling means to connect said two cylinders with each other during normal operation thereof, input means including power branching means for driving said two cylinder blocks, output means, two swash plates operatively connected with said output means, the pistons of a respective cylinder block being in operative engagement with a corresponding swash plate, means adapted to disengage said engine from said hydrostatic transmission, means for holding stationary said cylinder blocks, and throttling means in said hydrostatic transmission to force said pistons to supply said hydraulic medium to a respective one of said conduit systems at a relatively higher pressure to thereby effect braking of said output means with said engine disengaged from said hydrostatic transmission and with said two cylinder blocks held stationary.

9. The combination according to claim 8, wherein said throttling means includes a pressure relief valve automatically operative at a predetermined excess pressure of said hydraulic medium.

10. The combination according to claim 9, wherein said pressure relief valve is connected with said output means.

11. The combination according to claim 10, wherein said pressure relief valve is constructed as a stepped piston, and means operative against a spring pressure supplying a medium under pressure for determining said predetermined excess pressure at which said pressure relief valve operates.

12. The combination according to claim 11, further comprising means for supplying hydraulic medium to said two conduit systems including check valve means.

13. In a hydrostatic power transmission utilizing a hydraulic medium of the type having input means and output means, two positive displacement devices at least one of which is of the variable volume type and both of which are connected for operation with said output means, and conduits connecting said devices to form a hydraulic circuit for said hydraulic medium and including both of said devices, the combination of braking means for said output means operative to restrict, at will, delivery of fluid from at least one of said devices to thereby increase the pressure of said hydraulic medium and therewith effect braking of said output means as a result of such pressure increase, said braking means including a pressure relief valve connected between said conduits, said relief valve comprising a piston biased in one direction by spring means, a pressure space at the other end and means for applying a variable pressure control fluid to said pressure space tending to move said piston in opposition to said spring means, and a second pressure space connected to one of said conduits and tending to move said piston toward the first-mentioned pressure space.

14. In a hydrostatic power transmission utilizing a hydraulic medium of the type having input means and output means, two positive displacement devices at least one of which is of the variable volume type and both of which are connected for operation with said output means, and conduits connecting said devices to form a hydraulic circuit for said hydraulic medium and including both of said devices, the combination of braking means for said output means operative to restrict, at will, delivery of fluid from at least one of said devices to thereby increase the pressure of said hydraulic medium and therewith effect braking of said output means as a result of such pressure increase, said braking means including a pressure relief valve connected between said conduits, a journal for said output means and means for supplying replenishing fluid to said devices including a supply conduit leading to said journal.

15. In a hydrostatic power transmission utilizing a hydraulic medium of the type having input means and output means, two positive displacement devices at least one of which is of the variable volume type and both of which are connected for operation with said output means, and conduits connecting said devices to form a hydraulic circuit for said hydraulic medium and including both of said devices, the combination of braking means for said output means operative to restrict, at will, delivery of fluid from at least one of said devices to thereby increase the pressure of said hydraulic medium and therewith effect braking of said output means as a result of such pressure increase, said braking means including a pressure relief valve connected between said conduits, a journal for said output means and means for supplying replenishing fluid to said devices including a supply conduit leading to said journal together with passages leading from said journal to said conduits and a check valve in each of said passages.

16. In a hydrostatic power transmission utilizing a hydraulic medium of the type having input means and output means, two positive displacement devices at least one of which is of the variable volume type and both of which are connected for operation with said output means, and conduits connecting said devices to form a hydraulic circuit for said hydraulic medium and including both of said devices, the combination of braking means for said output means operative to restrict, at will, delivery of fluid from at least one of said devices to thereby increase the pressure of said hydraulic medium and therewith effect braking of said output means as a result of such pressure increase, said restricting means comprising throttling means for variably throttling the flow through both of said conduits, said restricting means comprising a ring rotatably mounted upon the output means and formed with openings which in one position register with said conduits and which when the ring is rotated relative to the output means gradually move out of registration to provide a variable restriction to flow through said conduits, together with means for so rotating said ring comprising an axially movable shifting ring mounted on said output means for rotation therewith and so connected to said ring that when the shifting ring is moved axially the flow restricting ring is rotated relative to the output means.

References Cited in the file of this patent

UNITED STATES PATENTS

| | | |
|---|---|---|
| 1,197,789 | Bluemel | Sept. 12, 1916 |
| 2,687,049 | Ebert | Aug. 24, 1954 |
| 2,737,900 | Smith | Mar. 13, 1956 |